Patented Jan. 5, 1932

1,839,271

UNITED STATES PATENT OFFICE

CECIL SHAW, OF DEIGHTON, HUDDERSFIELD, ENGLAND, ASSIGNOR TO L. B. HOLLIDAY & CO., LIMITED, OF DEIGHTON, HUDDERSFIELD, ENGLAND, A COMPANY OF GREAT BRITAIN

PRODUCTION OF BLACK VAT DYESTUFFS OF THE ANTHRACENE SERIES

No Drawing. Application filed April 19, 1927, Serial No. 185,068, and in Great Britain June 15, 1926.

The invention relates to the production of black vat dyestuffs of the anthracene series.

I have found that valuable black vat dyestuffs may be obtained by the action of certain highly oxygenated metallic salts on dibenzanthrone dissolved in sulphuric acid.

The metallic salts referred to are characterized by the facts that they are highly oxygenated and that they react with sulphuric acid to produce unstable highly oxygenated acids and/or peroxides. Examples of these metallic salts are dichromates, say of sodium or potassium.

The production of the black vat dyestuffs is entirely due to the action of the highly oxygenated acids and/or peroxides, because I have also found that substantially identical products are obtained whether the metallic salt reacts on dibenzanthrone dissolved in sulphuric acid or the product of the action of the metallic salt and sulphuric acid reacts on dibenzanthrone dissolved in sulphuric acid. This is well illustrated by the fact that substantially identical products are obtained by the addition of equivalent amounts of potassium dichromate, or the reaction product of potassium dichromate and sulphuric acid to similar sulphuric acid solutions of dibenzanthrone.

Analysis of the products obtained indicates that those new black vat dyestuffs contain at least four atoms of oxygen per molecule more than dibenzanthrone, and it appears probable that these new products are polyhydroxy-dibenzanthrones.

An example of the production of a dyestuff according to the invention is as follows:

100 parts of dibenzanthrone are dissolved in 2000 parts of 98% sulphuric acid and 110 parts of powdered sodium dichromate are added in portions until the temperature reaches 60° C., which temperature is maintained until all the dichromate is added. The solution is allowed to cool and then run into cold water. The precipitated dyestuff is filtered, washed and dried. The dyestuff consists of a black powder soluble in sulphuric acid giving a violet black solution, and soluble in caustic soda and sodium hydrosulphuric solution giving a vat almost identical in colour with the solution in sulphuric acid. It dyes cotton grey to black shades by direct oxidation in air from an hydrosulphite vat. These shades are excellently fast to light, washing, bleaching, acids and alkalis.

In the above example the sodium dichromate may first react with sulphuric acid and then react on the dibenzanthrone dissolved in sulphuric acid, the proportions being modified accordingly, and in either case potassium dichromate may be substituted for sodium dichromate.

I claim:

1. The method of producing black vat dyestuffs which consists in treating dibenzanthrone dissolved in sulphuric acid with an alkali metal dichromate.

2. The method of producing blank vat dyestuffs which consists in treating dibenzanthrone dissolved in sulphuric acid with sodium dichromate.

3. Black vat dyestuffs consisting of the product resulting from the treatment of dibenzanthrone dissolved in sulphuric acid with an alkali metal dichromate.

4. Black vat dyestuffs consisting of the product resulting from the treatment of dibenzanthrone dissolved in sulphuric acid with sodium dichromate.

In testimony whereof I affix my signature.

CECIL SHAW.